US012101008B2

(12) United States Patent
Neet et al.

(10) Patent No.: US 12,101,008 B2
(45) Date of Patent: Sep. 24, 2024

(54) STATOR WITH DIFFERENT CONDUCTOR TWISTS TO CREATE PHASE SHIFTING

(71) Applicant: BorgWarner Inc., Auburn Hills, MI (US)

(72) Inventors: Kirk Neet, Noblesville, IN (US); Tim Sailors, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 315 days.

(21) Appl. No.: 17/749,369

(22) Filed: May 20, 2022

(65) Prior Publication Data

US 2022/0376575 A1 Nov. 24, 2022

Related U.S. Application Data

(60) Provisional application No. 63/191,206, filed on May 20, 2021.

(51) Int. Cl.
*H02K 3/14* (2006.01)
*H02K 1/16* (2006.01)
*H02K 3/28* (2006.01)

(52) U.S. Cl.
CPC ............... *H02K 3/14* (2013.01); *H02K 1/165* (2013.01); *H02K 3/28* (2013.01); *H02K 2213/03* (2013.01)

(58) Field of Classification Search
CPC ........... H02K 3/14; H02K 1/165; H02K 3/28; H02K 2213/03; H02K 3/12
See application file for complete search history.

(56) References Cited

U.S. PATENT DOCUMENTS

| | | | |
|---|---|---|---|
| 7,034,428 B2 | 4/2006 | Cai et al. | |
| 7,622,843 B2 * | 11/2009 | Cai | H02K 3/28 310/179 |
| 11,539,257 B2 * | 12/2022 | Ahmed | H02K 15/064 |
| 2018/0034335 A1 | 2/2018 | Neet et al. | |

* cited by examiner

*Primary Examiner* — Thomas Truong
(74) *Attorney, Agent, or Firm* — Maginot, Moore & Beck, LLP

(57) ABSTRACT

A winding for a stator comprises (i) a plurality of first end turns provided on a first end of the stator core, (ii) straight portions extending through the slots, and (iii) a plurality of second turns provided on a second end of the stator core. The straight portions are arranged in layers in the slots in a number of layers. Each of the second end turns connects straight portions in two consecutive layers of two slots and is defined by a first common twist associated with one of the two consecutive layers and a second common twist associated with another of the two consecutive layers. The first common twist and the second common twist are identical for the second end turns in a first half of consecutive layers, and the first common twist and the second common twist are different for the second end turns in a second half of consecutive layers.

20 Claims, 13 Drawing Sheets

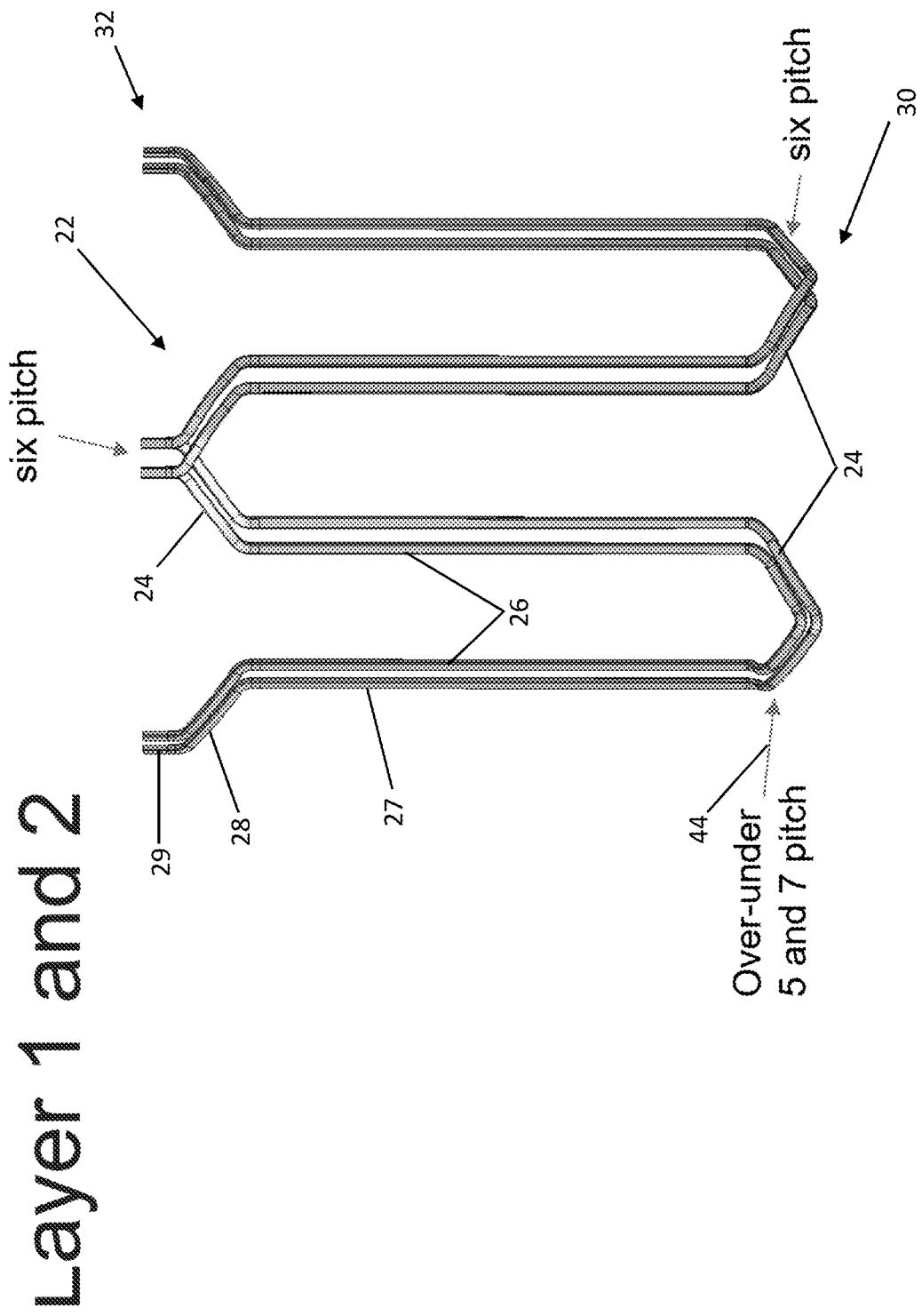

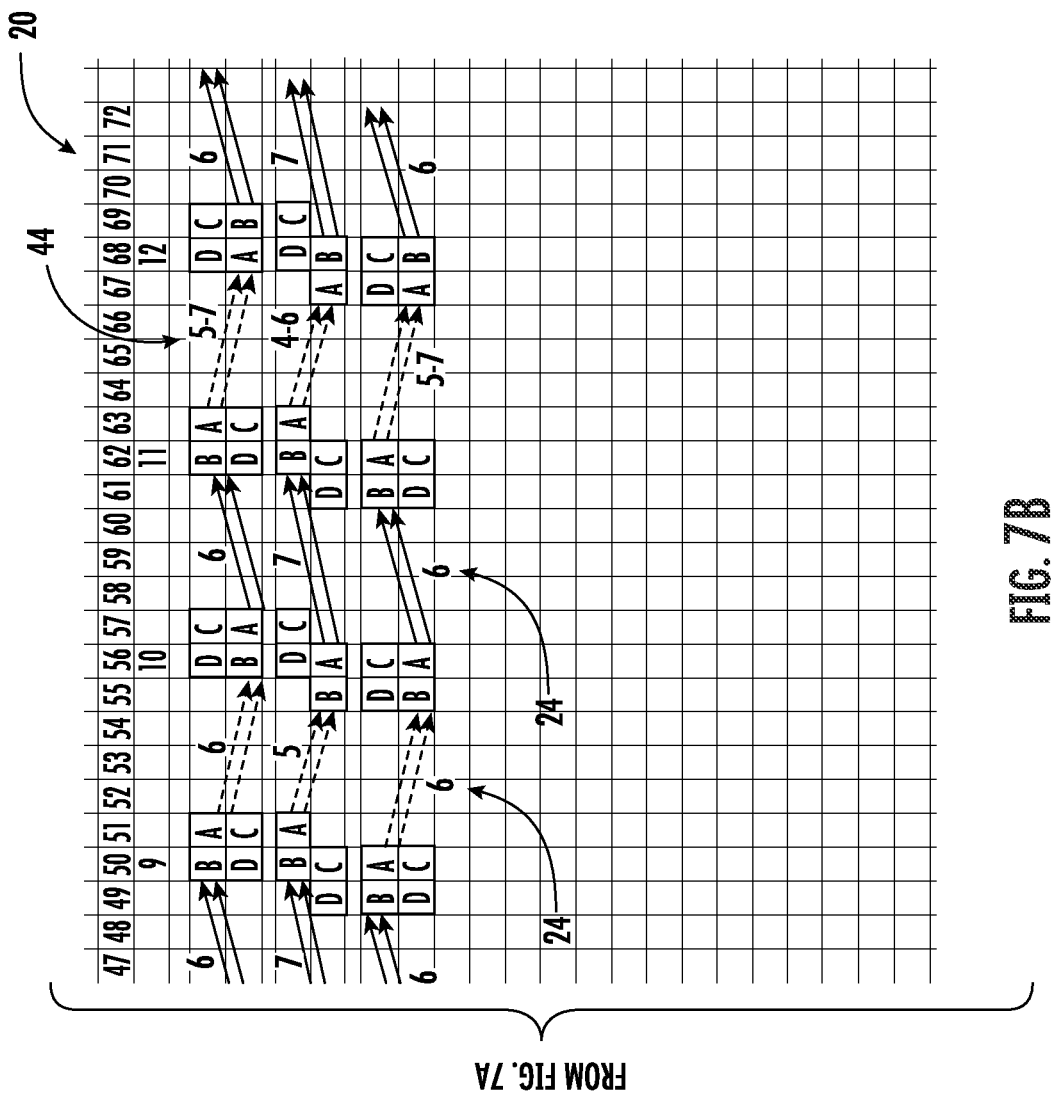

STATOR WITH DIFFERENT CONDUCTOR TWISTS TO CREATE PHASE SHIFTING

CROSS-REFERENCE TO RELATED APPLICATIONS

This application claims priority from U.S. provisional patent application No. 63/191,206, filed May 20, 2021, the entire contents of which are incorporated herein by reference.

FIELD

The present disclosure relates to the field of electric machines, and more particularly, stator winding arrangements.

BACKGROUND

Winding arrangements for stators are known, including winding arrangements formed with continuous windings and winding arrangements formed with segmented conductors. Continuous windings are formed from a series of long contiguous wires that are wound through the slots of a stator core. Alternatively, windings formed with segmented conductors are inserted into the slots of the stator core and the ends of the segments are then connected together. Each segmented conductor typically includes two straight segments connected by an end loop. Accordingly, segmented conductors are sometimes referred to as "hairpin conductors" or "U-turn conductors." In order to form a winding with segmented conductors, the segmented conductors are inserted axially into the slots of a stator core, and the ends of the conductors are connected together to form paths for the winding. An example of such a winding formed from segmented conductors is disclosed in U.S. Pat. No. 7,622,843, issued Nov. 24, 2009, the entire contents of which are incorporated herein by reference.

Segmented conductors come in a number of different configurations, including differently sized conductors, and conductors with different pitches defined by the end turn loop (i.e., the distance between the straight segments of such conductors). Segmented conductors may be used to form any number of different winding arrangements based on the size and shape of the segmented conductors and the connections made between the segmented conductors.

Different winding arrangements are typically suited for different applications. When an electric machine with higher efficiency and lower noise is desired, it is often desirable to have the phase belt of the stator winding to be half-full-half. For example for a stator having 2 slots per pole per phase, the phase belt would be 4-8-4 (four wires in the left slot, eight wires in the middle slot and four wires in the right slot). This is also sometimes referred to as short pitch winding or phase shifted winding. However, forming a winding arrangement with a half-full-half phase belt can be challenging from both a design perspective and a manufacturing perspective. From a design perspective, all of the paths of the winding arrangement must be properly connected with advantageous winding features that result in the desired performance characteristics for the electric machine. From a manufacturing perspective, connections between the straight segments can be challenging because many precise connections must be made at an end of the stator core where crowded conductors make the connections difficult.

In view of the foregoing, it would be advantageous to provide a segmented conductor winding arrangement with relatively simple connections between the segmented conductors. It would also be advantageous if the winding arrangement defined a half-full-half phase belt, thus resulting in a high efficiency electric machine with reduced noise. Additionally, it would be advantageous if such winding arrangement could be manufactured and produced with relative simplicity without the need for significant cost increases over other segmented winding arrangements. These features and advantages for an electric machine, as well as others, will become more readily apparent to those of ordinary skill in the art by reference to the following detailed description and accompanying drawings. While it would be desirable to provide an electric machine with a winding arrangement that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

SUMMARY

In at least one embodiment, a stator for an electric machine comprises a stator core and a winding positioned on the stator core. The stator core includes a plurality of teeth defining a plurality of slots. The winding is comprised of a plurality of segmented conductors connected together to provide a plurality of parallel paths per phase for the winding, each conductor comprising (i) an end loop provided on a crown end of the stator core, (ii) two legs extending through the slots, and (iii) two leg ends extending out of the slots on a connection end of the stator core, each leg end having a twist portion. The legs of the segmented conductors are arranged in layers in the slots. The layers include a total number of layers (L), wherein L is greater than five, and wherein the layers include a first half of consecutive layers and a second half of consecutive layers. Each leg end extending from each of the layers has a common twist associated with the layer from which said leg extends, the common twist being equal to a number of slots. The common twist associated with each layer of the first half of consecutive layers is a first common twist ($CT_1$). The common twist associated with at least one layer of the second half of consecutive layers is a second common twist ($CT_2$), and the common twist associated with at least one additional layer of the second half of consecutive layers is a third common twist ($CT_3$), wherein $CT_2 > CT_1$, and wherein $CT_3 < CT_1$.

In at least one embodiment, the conductors that provide the winding for the stator are connected together to provide a plurality of parallel paths per phase, each phase having a half-full-half phase belt. The winding comprises (i) a plurality of first end turns provided on a first end of the stator core, (ii) straight portions extending through the slots, and (iii) a plurality of second turns provided on a second end of the stator core. The straight portions are arranged in layers in the slots, wherein the layers include a total number of layers (L), wherein L is greater than five, the layers including a first half of consecutive layers and a second half of consecutive layers. Each of the second end turns connects straight portions in two consecutive layers of two slots, each of said second end turns including a first common twist associated with one of the two consecutive layers and a second common twist associated with another of the two consecutive layers. The first common twist and the second common twist are identical for the second end turns in the first half of consecutive layers, and the first common twist and the second common twist are different for the second end turns in the second half of consecutive layers.

In at least one embodiment, a stator for an electric machine includes a stator core and a winding comprising a plurality of segmented conductors connected together to provide a plurality of parallel paths per phase for the winding. Each segmented conductor includes (i) an end loop provided on a crown end of the stator core, (ii) two legs extending through the slots, and (iii) two leg ends extending out of the slots on a connection end of the stator core. Each leg end has a twist portion and a terminal portion, wherein the terminal portions of the leg ends are connected together to form end loops on the connection end of the stator core. The legs are arranged in layers in the slots, the layers including at least two inner layers, at least two outer layers, and two middle layers positioned between the at least two inner layers and the at least two outer layers. Each of the plurality of the end loops on the connection end of the stator extends between a first leg in one layer and a second leg in another layer such that each of the plurality of end loops on the connection end is associated with two layers. Most of the end loops on the connection end that are associated with the at least two inner layers and the at least two outer layers have a common pitch (CP). Most of the end loops associated with the two middle layers have a pitch of one of CP+1 or CP−1.

BRIEF DESCRIPTION OF THE DRAWINGS

FIG. 5A is a perspective view of segmented conductors used in first and second slot layers of the winding arrangement of FIG. 4;

FIGS. 7A and 7B are tabular diagrams illustrating a third embodiment of a segmented conductor winding arrangement having a half-full-half phase belt and six conductors per slot, and radially misaligned crossover end loops, the winding arrangement configured use in association with the stator of FIG. 1.

DESCRIPTION

A stator for an electric machine is disclosed herein. The stator includes a stator core with a winding formed thereon. The winding includes conductors arranged in layers in slots of the stator core. The conductors are arranged in a manner to provide a half-full-half phase belt wherein a left slot of each slot set is half full, a middle slot is completely full, and a right slot is half full. In such a phase belt, the conductors in the first half of consecutive layers of each slot set are shifted one slot to the left (or alternatively, to the right) of the conductors in the second half of consecutive layers. In order to accomplish such a winding arrangement with a half-full-half phase belt, a number of different end turn arrangements are possible. The winding arrangement selected for the electric machine depends on a number of factors, including the total number of layers (L) of conductors in each slot, and particularly the number of layer pairs in each slot (i.e., L/2).

General Configuration of Stator Core with Segmented Conductor Winding

Figure 1:
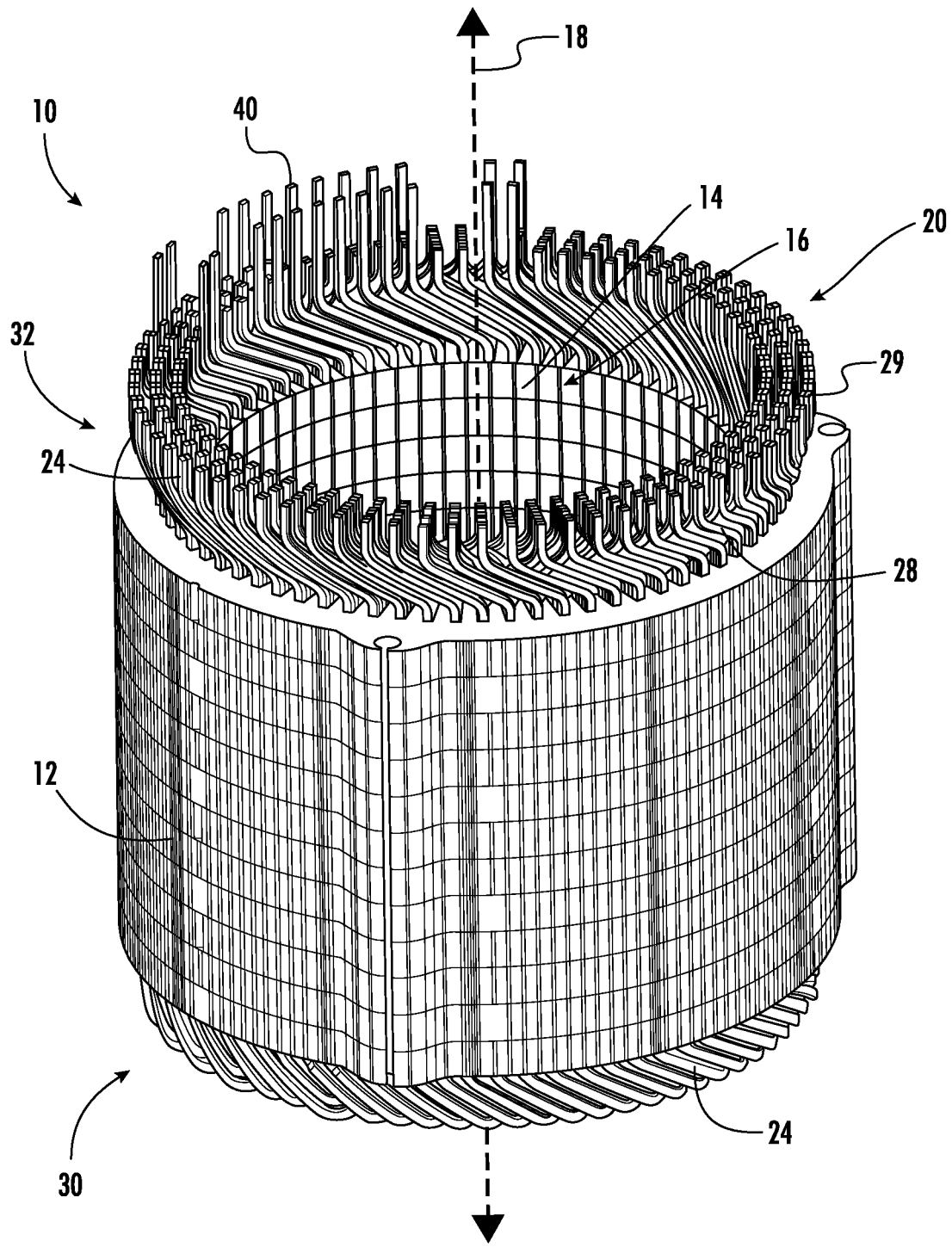
FIG. 1 is a perspective view of weld end of a stator core having a segmented conductor winding arrangement positioned thereon.

FIG. 1 shows a perspective view of the stator 10 for an electric machine, including a stator core 12 with a winding 20 formed on the stator core. The stator core 12 is comprised of a ferromagnetic material and is typically formed from a plurality of steel sheets that are stamped and stacked upon one another to form a lamination stack. The stator core 12 is generally cylindrical in shape as defined by a center axis 18, and includes an inner perimeter surface and an outer perimeter surface. The inner perimeter surface defines an inner diameter (ID) for the stator. The outer perimeter surface defines an outer diameter (OD) for the stator.

A plurality of teeth 14 are formed on the interior of the stator core 12 and directed toward the center axis 18. Each tooth 14 extends radially inward and terminates at the inner perimeter surface. Axial slots 16 are formed in the stator core 12 between the teeth 14. Each slot 16 is defined between two adjacent teeth, such that two adjacent teeth form two opposing radial walls for one slot. The teeth 14 and slots 16 all extend from a first end 30 (i.e., a "crown end") to a second end 32 (i.e., a "connection end" or "weld end") of the core.

Radial openings to the slots 16 are formed along the inner perimeter surface of the stator core 12. When the slots 16 are semi-closed, each radial opening to a slot 16 has a width that is smaller at the inner perimeter surface than at more radially outward positions (i.e., slot positions closer to the outer perimeter surface). In addition to the radial openings to the slots 16 through the inner perimeter surface (i.e., for open and semi-closed slots), axial openings to the slots 16 are also provided the opposite ends 30, 32 of the stator core 12.

As shown in FIG. 1, the stator core 12 is configured to retain the winding arrangement 20 within the slots 16 of the stator core 12. The winding arrangement 20 is formed from a plurality of interconnected conductor paths that are retained within the slots 16. The conductor paths are comprised of interconnected conductor portions that extend through the slots and generally wrap around the core 12. Each slot 16 is configured to retain some number of in-slot segments in "layers" of the slot, with the in-slot segments typically arranged in single-file manner such that each layer of the slot retains a single conductor segment.

Segmented Conductors for the Winding Arrangement

Figure 2:
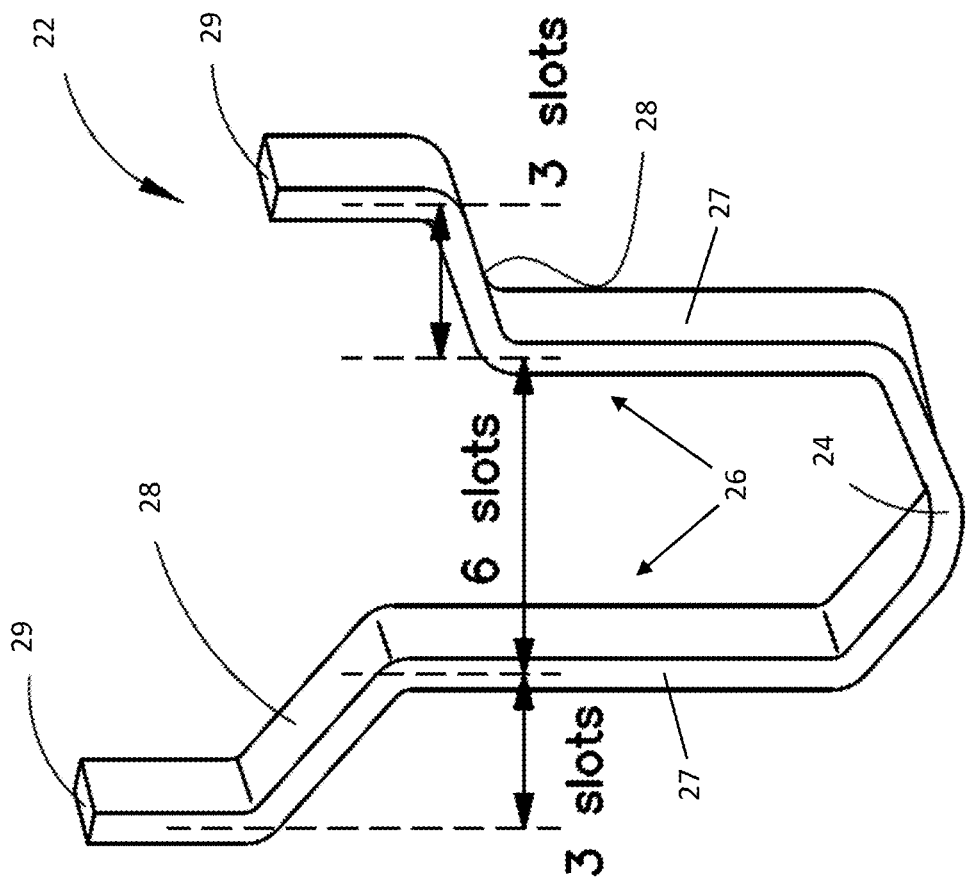
FIG. 2 is a perspective view of an exemplary segmented conductor used to form the winding arrangement of FIG. 1.

In at least some embodiments, the winding arrangement is formed from a plurality of interconnected segmented conductors. With reference to FIG. 2, an exemplary segmented conductor 22 is shown in isolation from the winding arrangement 20. The segmented conductor 22 is formed of a length of conductive material such as copper. The copper may be insulated with an outer layer of electrical insulation.

The exemplary segmented conductor shown in FIG. 2 also has a rectangular cross-sectional shape.

Each segmented conductor includes two legs 26 with an end loop 24 connecting the two legs 26. Each leg includes a straight portion 27, a twist portion 28, and a terminal portion 29. The straight portion 27 and the terminal portion 29 both extend in the axial direction. The straight portion 27 is configured to extend axially through one of the slots of the stator core and may also be referred to as an "in-slot portion." The twist portion 28 has axial, circumferential and radial direction components and extends between the straight portion 27 and the terminal portion 29.

The end loop 24 (which may also be referred to as the "end-turn" or "U-turn") of each segmented conductor 22 is arranged on the crown end 30 of the core and defines a 180° change in direction for the segmented conductor. The end loop also extends a circumferential distance associated with a number of slots of the stator core. This distance is referred to as the "pitch" (P) of the end loop. An end loop pitch P is defined as the end loop connecting a first straight segment in a particular slot number (S) with a straight segment in slot P+S. For example, a 6 pitch end loop (i.e., P=6) is defined as connecting a straight segment in slot 1 of the core (i.e., S=1) with a straight segment in slot 7 of the core (i.e., 6+1=7). In the exemplary conductor of FIG. 2, the end loop 24 is shown extending a distance equal to six slots of the core (i.e., P=6). Thus, as noted in the example above, if the straight portion 27 of the first leg is positioned in slot one of the core, the straight portion 27 of the second leg is positioned in slot seven of the core.

When forming the winding 20, the legs 26 are inserted axially into the slots 16 of the core 12, with all of the end loops 24 arranged on the crown end 30 of the core. For each segmented conductor, one leg is positioned in one layer of a slot, and the other leg is positioned in an adjacent layer of another slot, wherein the two slots are separated by the pitch of the end loop 24 on the crown end 30 of the core 12. Following insertion into the slots, the leg ends extend axially out of the connection end 32 of the stator core. The ends of the legs 26 of each segmented conductor 22 are then bent/twisted in opposite directions such that the twist portion 28 of one leg extends in an opposite circumferential direction from the twist portion 28 of the other leg. This circumferential distance spanned by each twist portion 28 is associated with a number of slots of the stator core 12, and is referred to as the "twist" (T) of the leg 26. In the exemplary conductor of FIG. 2, each leg 26 has a twist of three slots.

After twisting the legs 26, the terminal portions 29 of different conductors are connected together (e.g., by welding or other connection method) on the connection end 32 of the stator core 12 in order to complete the winding 20. Together, the twists (T) of two segmented conductors connected at their respective terminal portions 29 form an end loop defined by a pitch (P) on the weld end 32 of the stator core. Therefore, it will be recognized that each end loop 24 at the crown end 30 has a pitch defined by the end loop of the associated segmented conductor, while each end loop 24 at the weld end 32 has a pitch defined by the two twists (T) of two connected leg ends (i.e., the connected terminal portions 29 of two leg ends).

While FIG. 2 illustrates one exemplary embodiment of a segmented conductor for the winding arrangement 20, it will be recognized that differently shaped conductor segments are also contemplated. For example, the pitch of the end loops 24 and the twist of the leg ends may be different with different segmented conductors used in the winding arrangement 20. As another example, leads 40 to the winding may be provided by elongated terminal portions 29 that extend past other terminal portions on the weld end 32 of the stator core 12.

Winding Arrangement with Even Number of Layer Pairs

Figure 3A:
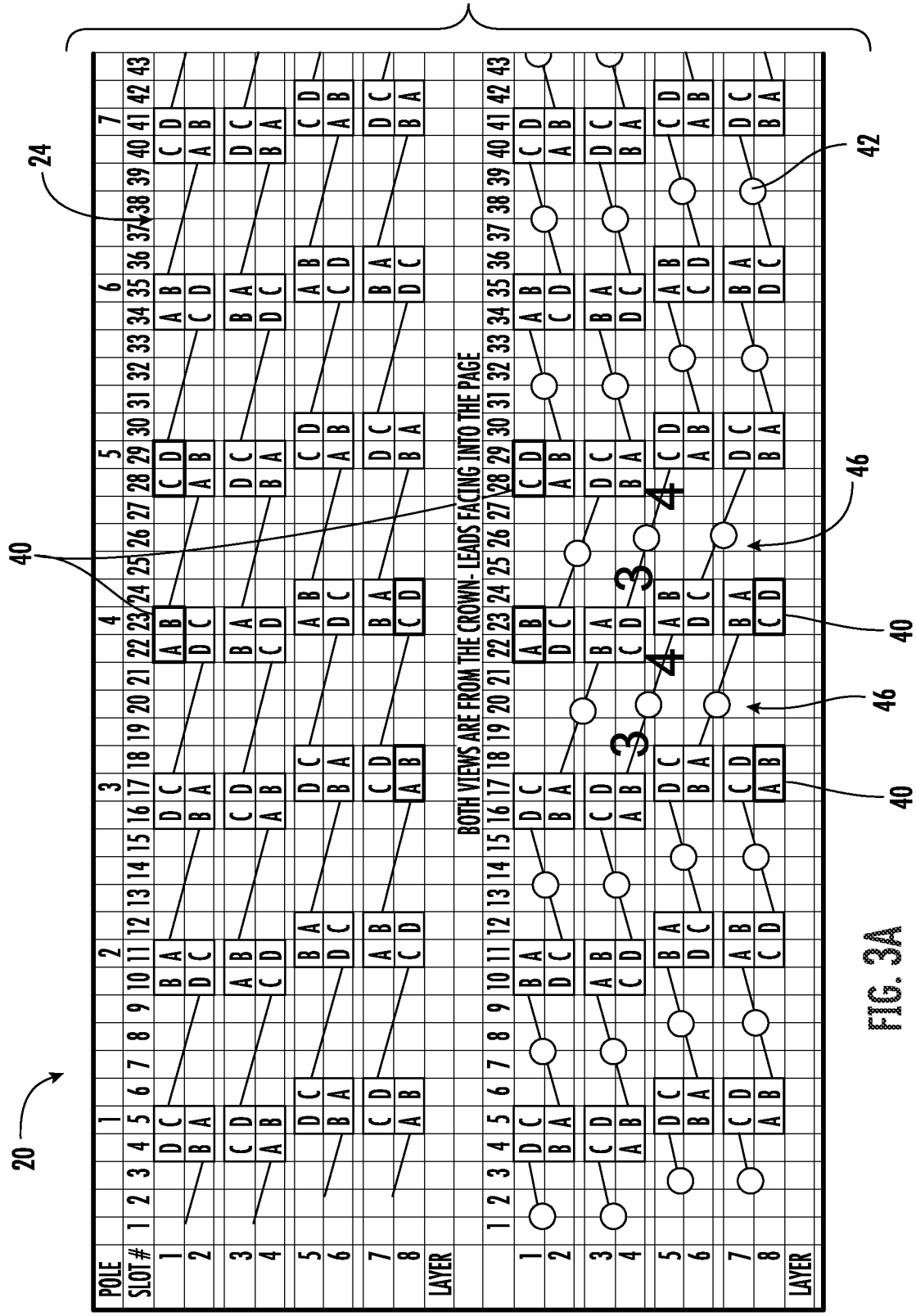
FIGS. 3A and 3B are tabular diagrams illustrating a first embodiment of a segmented conductor winding arrangement having a half-full-half phase belt and eight conductors per slot, the winding arrangement configured for use in association with the stator of FIG. 1.
Figure 3B:
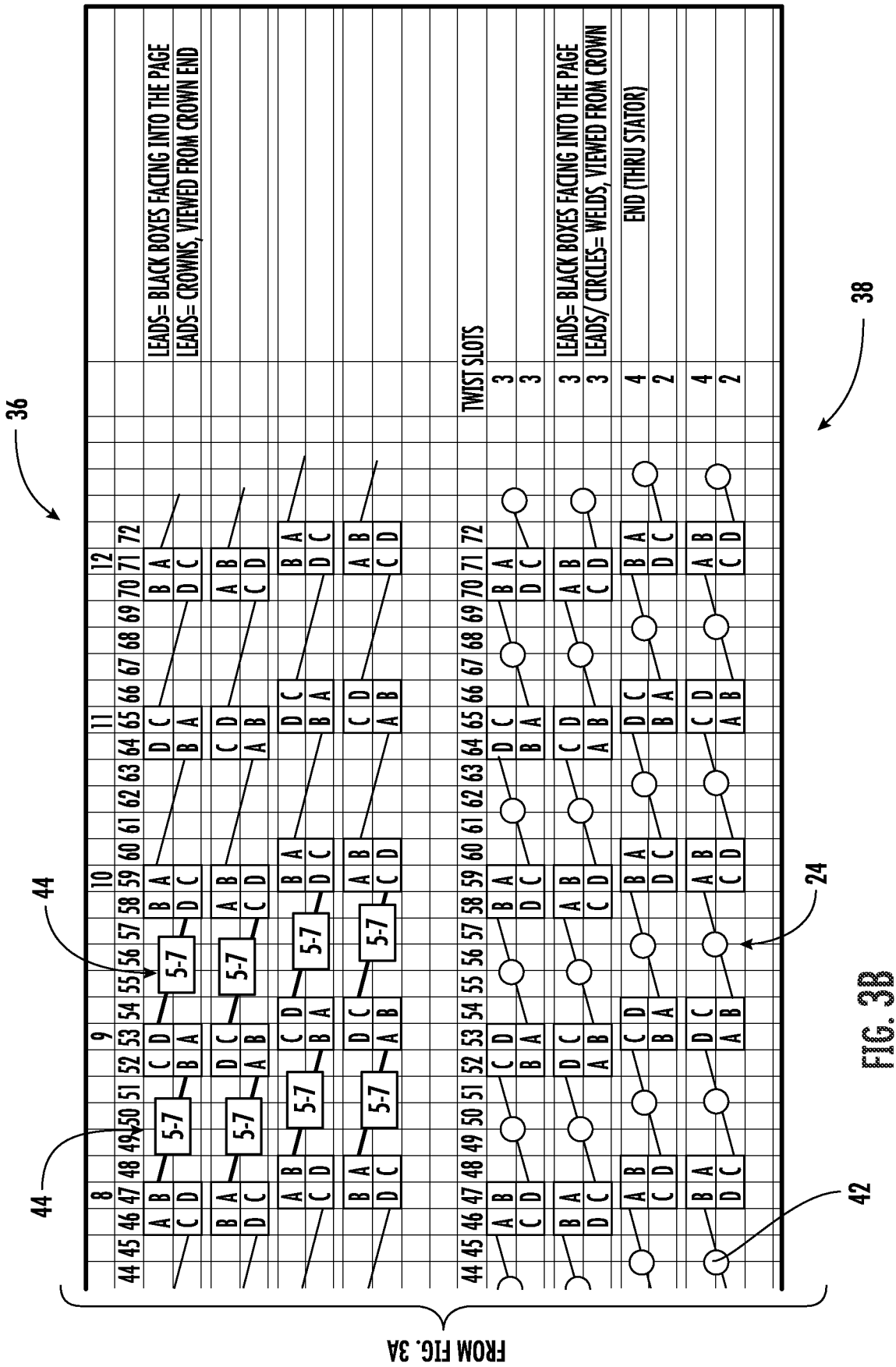

With reference now to FIGS. 3A and 3B are tabular diagrams illustrating, a tabular view of a stator winding arrangement 20 is shown, wherein the winding arrangement is formed from a plurality of segmented conductors 22, as described above. It will be noted that FIGS. 3A and 3B are shown in different figures, but are combined to provide a complete tabular schematic of the winding arrangement wherein FIG. 3A is the left side of the schematic and FIG. 3B is the right side of the schematic. Accordingly, the term "FIG. 3" as used herein refers to the complete schematic of the winding wherein FIGS. 3A and 3B are combined. As noted in the top two rows of the table of FIG. 3, the winding arrangement 20 includes twelve poles (as noted by the twelve slot sets associated with each phase) and is configured for use in a stator core having seventy-two slots. As noted in the leftmost column of FIG. 3, the conductors of the winding (i.e., the straight portions 27 of the conductor legs) are arranged in single-file manner in eight layers (L) in each of the seventy-two slots. In the disclosed embodiment of the winding, layer 1 is an inner layer of each slot and layer 8 is an outer layer of each slot, but it will be recognized that the winding may also be configured in the opposite arrangement wherein layer 1 is the outer layer and layer 8 is the inner layer of the slot.

Because the winding 20 of FIG. 3 includes eight layers, L/2 is an even number (i.e., L/2=8/2=4), and this means that there are an even number of "layer pairs" for the winding of FIG. 3, wherein each layer pair is associated with one wrap of the various paths of a winding phase around the stator core (i.e., each path is defined by the winding phase includes four parallel paths: A, B, C and D as noted in the table of FIG. 3, and each wrap of a path extends through the twelve slot sets). Straight conductor portions for each path are arranged alternately in layers one and two (a first layer pair) for a first wrap around the stator core. The path then transitions to layers three and four (a second layer pair) for a second wrap around the stator core, followed by a third wrap around the stator core in layers five and six (a third layer pair), and a fourth wrap around the stator core in layers seven and eight (a fourth layer pair).

Only one phase of the winding is illustrated in FIG. 3, and it will be recognized that, for a three phase winding, the two other phases are identical to that shown, but the first additional phase is shifted over two slots, and the second additional phase is shifted over four slots.

As shown in FIG. 3 each path of the winding includes four parallel paths (i.e., paths A, B, C and D as noted in the table). Leads 40 for each path are illustrated by the bold/darkened black boxes surrounding the associated path. The winding 20 defines a half-full-half phase belt. In other words, for each pole and each phase, the conductors of a given slot set are spread over three slots, where the left slot is half full, the center slot is completely full, and the right slot is half full. In particular, the winding of FIG. 3 has a 4-8-4 phase belt such that each slot set for a given phase includes four left conductors, eight center conductors, and four right conductors. As can be seen in FIG. 3, layers 1-4 are all similar with conductors for the four paths (A-D) arranged in the left slot and the middle slot of each slot set, and layers 5-8 are all similar with conductors for the four paths (A-D) arranged in the right slot and middle slot. In other words, the winding arrangement of FIG. 3 includes conductors in layers 1 through 4 shifted one slot to the left of the conductors in layers 5-8.

The table of FIG. 3 includes an upper section 36 and a lower section 38 for the purpose of easily illustrating the end loops for the winding. In both the upper section 36 and lower section 38 of the table, the lines extending between the slot sets indicate the general arrangement of the end loops extending between slot sets. The upper section 36 of the table illustrates the end loops 24 on the crown end 30 of the stator core, each of which extends between the two conductors in two different slots of the winding (i.e., each end loop provided by the pre-formed end loop 24 of one of the segmented conductors 22). The lower section 38 of the table illustrates the end loops formed on the connection end 32 of the stator core which extend between conductors in various slots for one phase of the winding (i.e., end loops formed by the twisted leg ends and connections between the terminal portions 29).

In the upper section 36 of the table, the lines extending between the slots indicate the general arrangement of the end loops on the crown end 30, viewed from the crown end. Each line extending between the slot sets is associated with a pair of end loops on the crown end of the stator. For example, the top line extending between the slot sets associated with poles one and two on the upper section 36 of the table represents both a first end loop and a second end loop on the crown end 30 of the core. The first end loop connects the path C straight conductor positioned in layer 1 of slot 5 to the path C straight conductor positioned in layer 2 of slot 11. The second end loop connects the path D straight conductor arranged in layer 1 of slot 4 to the path D straight conductor in layer 2 of slot 10. All of the end loops 24 on the crown end are interleaved six-pitch end loops with the exception of a special set of over-under end loops 44 positioned between poles eight and nine and between poles nine and ten. Each pair of over-under end loops 44 includes a seven-pitch over end loop that bridges across a five-pitch under end loop. It will be noted that all of the end loops 24 on the crown end are regular end loops that are confined within a single layer pair. In other words, all end loops 24 extend between the layers of one of the first layer pair (i.e., layers 1 and 2), the second layer pair (i.e., layers 3 and 4), the third layer pair (i.e., layers 5 and 6), or the fourth layer pair (i.e., layers 7 and 8).

The lower section 38 of the table of FIG. 3 is similar to the upper section 36, with the lines extending between slot sets indicating the general arrangement of the end loops on the connection end 32, viewed from the crown end 30 (i.e., looking through the stator to the connection end). One line is associated with a pair of end loops on the connection end 32 of the stator. For example, the bottom line extending between poles one and two on the lower section 38 of the table represents a first end loop and a second end loop. The first end loop connects the path A straight conductor positioned in layer 8 of slot five to the path A straight conductor positioned in layer 7 of slot eleven. The second end loop connects the path B straight conductor positioned in layer 8 of slot six to the path B straight conductor positioned in layer 7 of slot twelve.

The circles 42 on the lines in the lower section 38 of the table indicate that two terminal portions of leg ends for a given path are connected together (e.g., welded together) to form one of the associated end loops. For example, the circle on the bottom line extending between poles one and two on the lower section 38 of the table represents a connection between the terminal portions of the A path legs in slots five and eleven, and another connection between the terminal portions end loop connecting the B path legs in slots six and twelve. Each of the leg ends is twisted a number of slots to form the winding arrangement, as explained in further detail below.

Most of the end loops 24 on the connection end 32 of the stator core are regular end turns that connect straight conductor segments within the same layer pair (e.g., the end loop 24 connecting the path A conductor in layer 8 of slot fifty-three to the path A conductor in layer 7 of slot fifty-nine—this end loop extends between two conductors in the fourth layer pair). However, in addition to regular end turns that extend between conductors in the same layer pair, the end turns on the connection end 32 also include a group of crossover end turns 46 that connect one layer pair to an adjacent layer pair. For example, the crossover end turns 46 extending between poles three and four in the lower section 38 of the table of FIG. 3 include a first crossover end turn connecting the path A conductor in layer 2 of slot seventeen to the path A conductor in layer 3 of slot twenty-three (thus connecting the first layer pair to the second layer pair for path A), and a second crossover end turn connecting the path B conductor in layer 2 of slot sixteen to the path B conductor in layer 3 of slot twenty-two (thus connecting the first layer pair to the second layer pair for path B). Six pairs of crossover end turns are shown in the lower section 38 of the table of FIG. 3, including three pairs of crossover end turns extending between the slot sets associated with poles three and four, and three crossover end turns extending between the slot sets associated with poles four and five. Two pairs of crossover end turns connect conductors in layer 2 to conductors in layer 3 (i.e., connect the first layer pair to the second layer pair), two pairs of crossover end turns connect conductors in layer 4 to conductors in layer 5 (i.e., connect the second layer pair to the third layer pair), and two pairs of crossover end turns connect conductors in layer 6 to conductors in layer 7 (i.e., connect the third layer pair to the fourth layer pair).

As noted previously, the winding of FIG. 3 has an even number of layer pairs (i.e., L/2=8). This allows the stator to be designed with end loops having all common pitches (CP) on the connection end 32, except for the crossover end loops that extend between the two adjacent middle layers of the winding (i.e., the crossover end loops that transition each path between the second layer pair defined by layers three and four and the third layer pair defined by layers five and six). These crossover end loops have a pitch of CP−1 or CP+1. For example, in the winding arrangement of FIG. 3 wherein the winding is defined by 2 slots per pole per phase and 8 wires per slot, all end loops on the connection end 32 all have a common pitch (CP) of six, except the crossover loops that extend between layer 4 and layer 5. These special end loops have a pitch equal to five or seven (CP−1 or CP+1). Accordingly, in view of the existence of certain special end loops (e.g., certain "crossover end loops" or certain "over-under" end loops), it will be recognized that the term "common pitch" as used herein refers to the regular or most common pitch for the winding, or the most common pitch for a given layer pair, as the case may be.

In order to form the end turns on the connection end 32 all having the same common pitch of six, with the exception of the special end loops having a pitch of five or seven (CP−1 or CP+1), the legs of the conductors extending from each layer are bent by different twists. One easy way to form an end loop at the connection end of the core having a common pitch of six is to twist the legs in one layer three slots clockwise and the legs in an adjacent layer (but six several slots removed) three slots counter clockwise, and then connect the leg ends in order to form end loops having a pitch of six. However, as discussed previously, the winding arrangement of FIG. 3 includes conductors in layers 1 through 4 shifted one slot to the left of the conductors in layers 5-8. Therefore, the crossover end loops extending from layer 4 to layer 5 must be seven pitch end loops (or alternatively, if layers 1-4 are shifted one slot to the right, the crossover end loops 46 extending from layer 4 to layer 5 are five pitch end loops). Because of this, a conventional twist of the leg ends in layer 4 by three slots in one direction and a twist of the leg ends in layer 5 by three slots in the opposite direction is insufficient, as that will only create a six pitch crossover end loop between layers 4 and 5, when a seven pitch crossover end loop is what is needed. However, a seven pitch end loop may be created by twisting the leg ends in layer 4 by three slots and twisting the leg ends in layer 5 by four slots. As a result, the crossover end turns 46 extending from layer 4 to layer 5 (i.e., those in between poles three and four and those between poles four and five), are seven pitch end turns, as shown in the lower section 38 of the table of FIG. 3. Therefore, for the winding of FIG. 3, it will be noted that the twists on the leg ends at the connection end of the core are as follows:

Layers 1-4 (i.e., a first half of consecutive layers): twist all leg ends three (3) slots (with the leg ends in alternating layers twisted opposite directions, thus forming standard six pitch end turns for the first layer pair (i.e., for layers 1 and 2) and the second layer pair (i.e., for layers 3 and 4), and forming six pitch crossover end turns between layers 2 and 3);

Layer 5: twist all leg ends four (4) slots (thus forming seven pitch crossover end loops between layers 4 and 5, wherein layer 4 is twisted three slots in one direction and layer 5 is twisted four slots in the opposite direction);

Layer 6: twist two (2) slots (thus forming six pitch end loops for the third layer pair (i.e., for layers 5 and 6), with layer 5 twisting in the opposite direction from layer 6);

Layer 7: twist four (4) slots (thus creating 6 pitch cross over end loops between layers 6 and 7, wherein layer 7 is twisted in the opposite direction from layer 6); and Layer 8: twist two (2) slots (thus forming six pitch end loops for the fourth layer pair (i.e., for layers 7 and 8), with layer 7 twisting in the opposite direction from layer 8)

As a result of the above-described twisting, it will be recognized that the embodiment of FIG. 3 discloses a winding is comprised of numerous conductor legs arranged in layers (L) of a plurality of slots, wherein L is greater than five, and particularly L is equal to eight. The layers include a first half of consecutive layers and a second half of consecutive layers, wherein each leg end extending from each of the layers has a common twist associated with the layer from which said leg extends. The common twist associated with each layer of the first half of consecutive layers is a first common twist ($CT_1$, wherein $CT_1=3$). The common twist associated with each layer of the second half of consecutive layers alternates between a second common twist ($CT_2$) and a third common twist ($CT_3$), wherein $CT_2 \geq CT_1+1$ (i.e., $CT_2 \geq 4$), and wherein $CT_3 \leq CT_1-1$ (i.e., $CT_3 \leq 2$).

Furthermore, the winding arrangement of FIG. 3 may be recognized as a winding wherein each of the end turns on the connection end of the core connects straight portions of conductors arranged in two consecutive layers of two slots, wherein each of the end turns includes a first common twist associated with one of the two consecutive layers and a second common twist associated with the other of the two consecutive layers. In such embodiment, the first common twist and the second common twist are identical for the end turns in the first half of consecutive layers (e.g., in layers 1-4 the common twist is three), but the first common twist and the second common alternate between different common twists for the end turns in the second half of consecutive layers (e.g., the common twist is four in layers 5 and 7, and the common twist is two in layers 6 and 8).

Figure 4A:
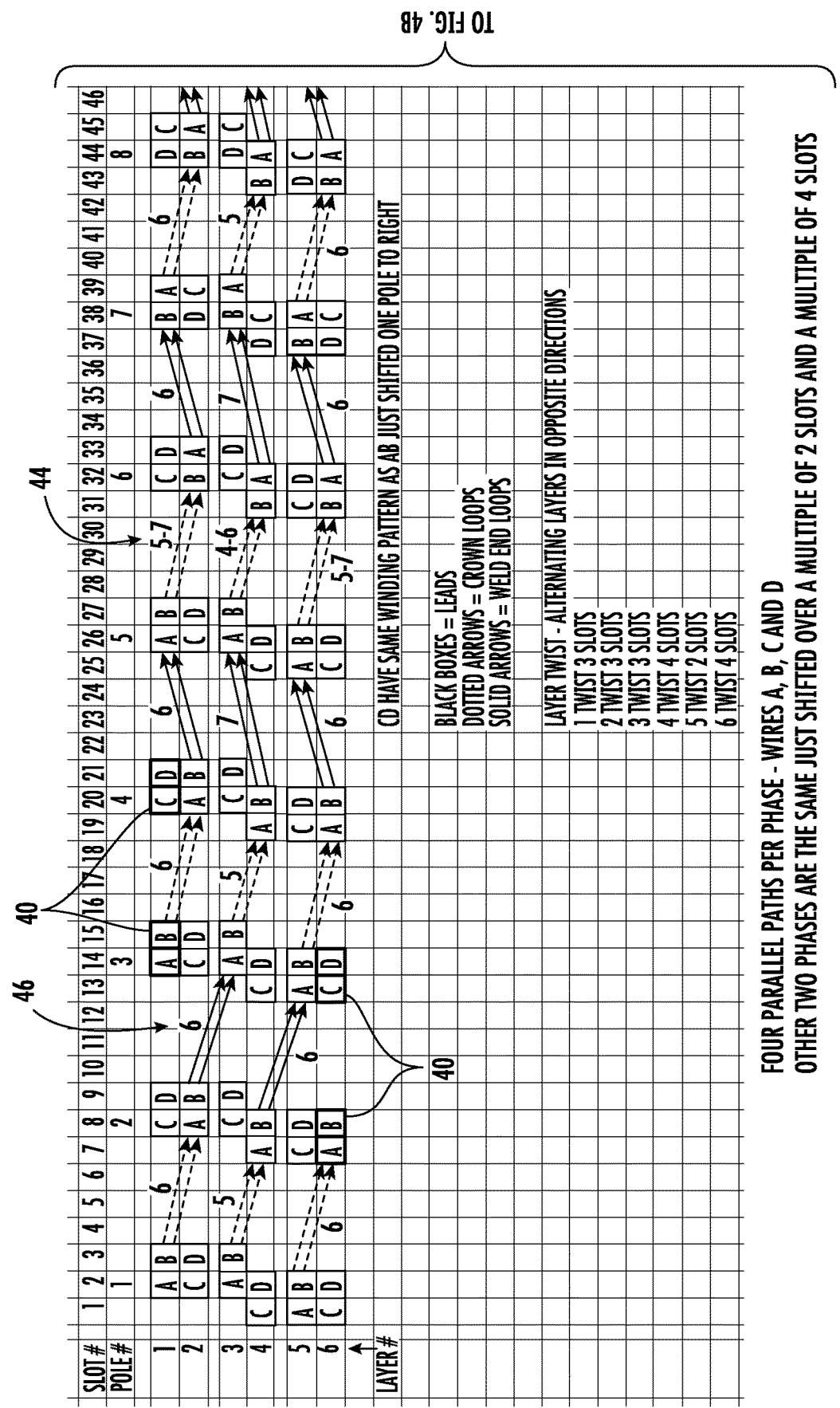
FIGS. 4A and 4B are tabular diagrams illustrating a second embodiment of a segmented conductor winding arrangement having a half-full-half phase belt and six conductors per slot, the winding arrangement configured use in association with the stator of FIG. 1.
Figure 4B:
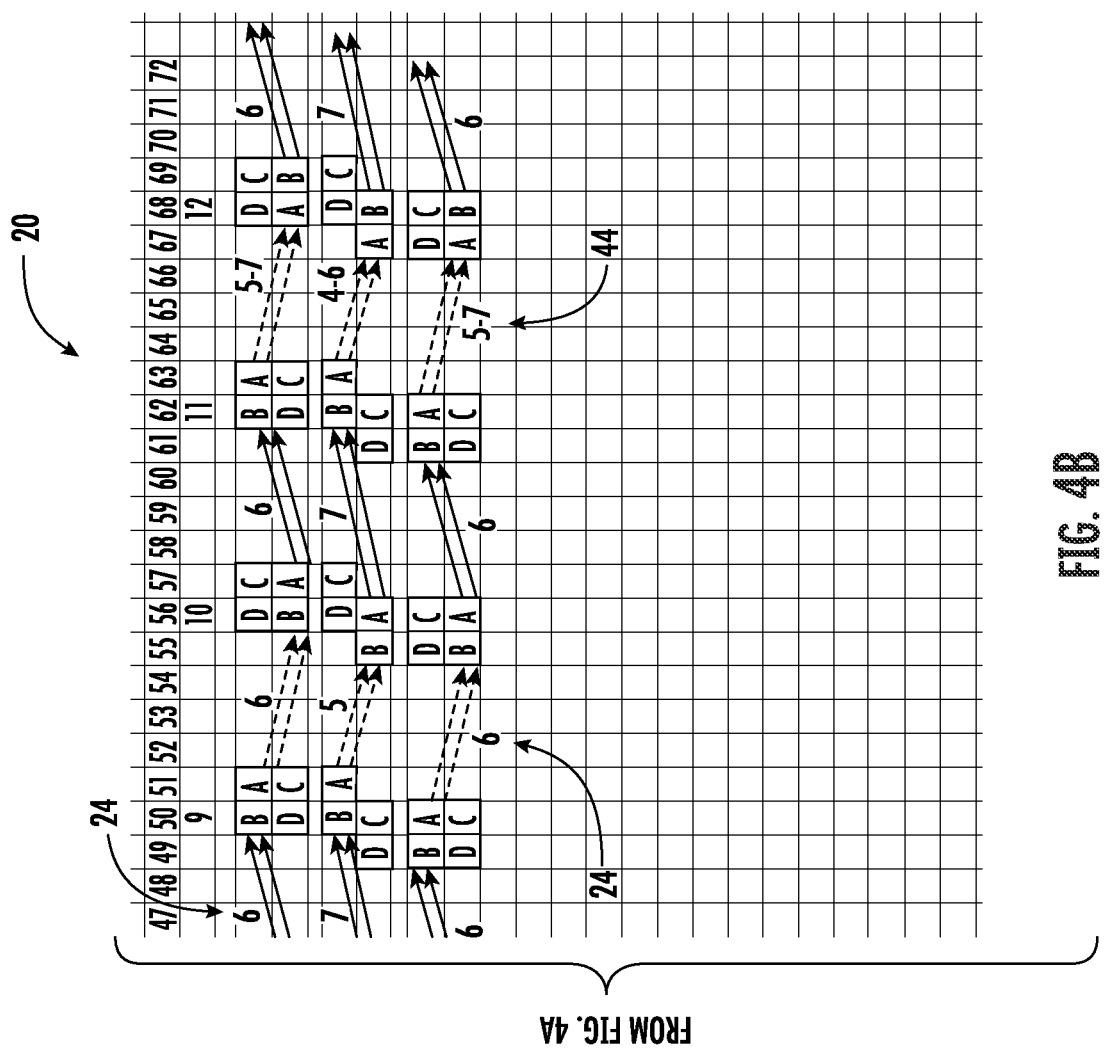

Winding Arrangement with Odd Number of Layer Pairs and Aligned Leg Ends, Including Crossover Leg Ends With reference now to FIGS. 4A and 4B, a tabular view of an alternative embodiment of the winding arrangement of FIG. 3 is shown. It will be noted that FIGS. 4A and 4B are shown in different figures, but are combined to provide a complete tabular schematic of the winding arrangement wherein FIG. 4A is the left side of the schematic and FIG. 4B is the right side of the schematic. Accordingly, the term "FIG. 4" as used herein refers to the complete schematic of the winding wherein FIGS. 4A and 4B are combined. Similar to FIG. 3, the winding arrangement 20 of FIG. 4 is a three phase winding with four parallel paths per phase (i.e., paths A-D). However, in FIG. 4, the conductors are arranged in a number of layers (L) in each slot such that L/2 is an odd number (i.e., the number of layer pairs is an odd number in FIG. 4, as opposed to an even number in FIG. 3). In particular, there are six layers of conductors in each slot for the winding arrangement of FIG. 4, such that L=6, and L/2=3 (i.e., an odd number). Only the end turns between path A and path B are shown in FIG. 4, for the sake of brevity. The end turns 24 on the crown end 30 are shown as dotted line arrows, and the end turns on the connection end are shown as solid line arrows in FIG. 4. It will be recognized that the end turns between path C and path D are similar to those shown for path A and path B, but the end turns are on the opposite side of the core. For example, while FIG. 4 shows that the path A and path B end loops extending between the slot sets associated with poles one and two are on the crown end 30 of the core, it will also be recognized that the path C and path D end turns extending between the slot sets associated with the same poles one and two are on the connection end 32 of the core. Accordingly, unlike FIG. 3, an upper section and a lower section is not shown for the tabular view of the winding arrangement of FIG. 4, for the sake of brevity.

Because the winding arrangement of FIG. 4 has an arrangement wherein L/2 is an odd number (i.e., L/2=3), the twists and pitches of the winding arrangement must be adjusted from that of FIG. 3 (where L/2 is an even number). First, it will be recognized that the two middle layers in the winding arrangement of FIG. 4 are associated with one layer pair wherein each path in the layer pair forms one wrap around the core (i.e., the two middle layers are layers three and four, and layers 3 and 4 are the same layer pair where each of paths A-D forms one wrap around the core). This is different from the winding arrangement of FIG. 3, because the middle layers of the winding arrangement of FIG. 3 are associated with two different layer pairs (i.e., the middle layers in FIG. 3 include layers 4 and 5, wherein layer 4 is part of one layer pair associated with layers 3 and 4, and layer 5 is part of another layer pair associated with layers 5 and 6). Because the middle layers of FIG. 3 are associated with two different layer pairs, it will be noted that each path that in the middle layers is associated with two different wraps around the core (i.e., each path wraps once around the core for layers 3 and 4 and once again around the core for layers 5 and 6). As such only crossover end turns are required to connect the middle layers in FIG. 3. In contrast, in the winding of FIG. 4, end turns within the same layer pair connect the middle layers. Notwithstanding this difference, the winding arrangement of FIG. 4 is similar to FIG. 3 because the winding of FIG. 4 is defined by a middle layer pair (i.e., the layer pair consisting of layers 3 and 4) that includes one layer (i.e., layer 3) with a first common twist that matches the first half of consecutive layers (i.e., in layers 1-3, $CT_1$=3), and another layer (i.e., layer 4) that has a second common twist ($CT_2$) that is one slot greater than the first common twist (i.e., in layer 4, $CT_2$=$CT_1$+1=3+1=4). The remaining layers include a third common twist ($CT_3$) in layer five that is one less than the first common twist (i.e., in layer 5, $CT_3$=$CT_1$-1=3-1=2). Advantageously, because the common twist for layers 4-6 are different from that of layers 1-3, the winding of FIG. 4 is equipped with a half-full-half phase belt, even though L/2 is an odd number. In particular, in the arrangement of FIG. 4, layers 1-3 include conductors in left and middle slots of each pole set, and layers 4-6 include conductors in the right middle slots.

In addition to the above, another difference between the winding arrangement of FIG. 3 and that of FIG. 4 is that the common pitches of the end loops 24 are different for different layer pairs on the crown end (as opposed to all end loops on the crown end having the same common pitch in FIG. 3). In the winding arrangement of FIG. 4, all of the end loops have a common pitch ($CP_1$) of six (i.e., $CP_1$=6) for the inner and outer layer pairs (i.e., of the end loops for layers 1 and 2 have a common pitch of six, and the end loops for layers 4 and 6 have a common pitch), with the exception of four over-under end loops 44 on the crown end between poles five and six (wherein the over end loops have a seven pitch and the under end loops have a five pitch) and four over-under end loops 44 between poles eleven and twelve. However, for layers 3 and 4 (i.e., the two middle layers of the winding), the common pitch ($CP_2$) on the crown end is five (i.e., $CP_2$=$CP_1$-1), and the common pitch ($CP_3$) on the connection end is seven (i.e., $CP_3$=$CP_1$+1), with the with the exception of four over-under end loops 44 on the crown end between poles five and six and four over-under end loops 44 between poles eleven and twelve. Thus, in the example of FIG. 4, the winding 20 has two slots-per-pole-per-phase and six wires per slot, wherein layers 1, 2, 5, and 6 are all associated with end loops having a common pitch of six (i.e., $CP_1$=6 with the exception of the over-under end loops on the crown end), and layers 3 and 4 have end loops associated with a common pitch of five on one axial end (i.e., $CP_2$=5 with the exception of the over-under end loops on the crown end) and end loops with a common pitch of seven on the opposite axial end (i.e., $CP_3$=7 with the exception of the over-under end loops on the connection end). Thus, it will be recognized that in the embodiment of FIG. 4, the end loops of the two middle layers alternate between having a pitch equal to $CP_1$+1 on one axial end of the core and $CP_1$-1 on the opposite axial end of the core In order to form the winding arrangement of FIG. 4, U-shaped conductors are inserted axially into the slots, and the leg ends are twisted. Adjacent terminal ends of the legs are then welded to form end loops on the connection end having the predetermined pitch, as described above (e.g., six pitch or other pitch end loop). The end loops required to form the winding arrangement of FIG. 4 are illustrated in each of FIGS. 5A-5C, as described in further detail in the paragraphs below.

With reference now to FIG. 5A, exemplary U-shaped conductors used to form two of the conductor paths (e.g., path A and path B) of layers 1 and 2 of the winding arrangement of FIG. 4 are shown, and particularly the conductor paths extending from poles five through eight. As shown in FIG. 5A, the two end loops 24 on the crown end 30 extend between the slot sets of poles five and six and form over-under end turns having pitches of five and seven, respectively. The remainder of the end loops on the crown end 30 for layers 1 and 2 are six pitch end loops, including the two end loops extending between the slot sets of poles seven and eight, as shown in FIG. 5A. On the opposite end of the core, i.e., on the connection end 32, the leg ends are twisted to provide adjacent terminal ends that are then welded together to form the end loops. As noted previously, all of the end loops 24 on the connection end 32 for layers 1 and 2 are six pitch end loops. In order to optimize resistance and end loop height in layers 1 and 2, one leg end in layer 1 is twisted three slots one direction (e.g., clockwise) and one leg end in layer 2 is twisted three slots in the opposite direction (e.g., counter-clockwise). When the terminal ends of these leg ends are connected together, they form six pitch end loops between layers 1 and 2 on the connection end 32 of the core.

Figure 5B:
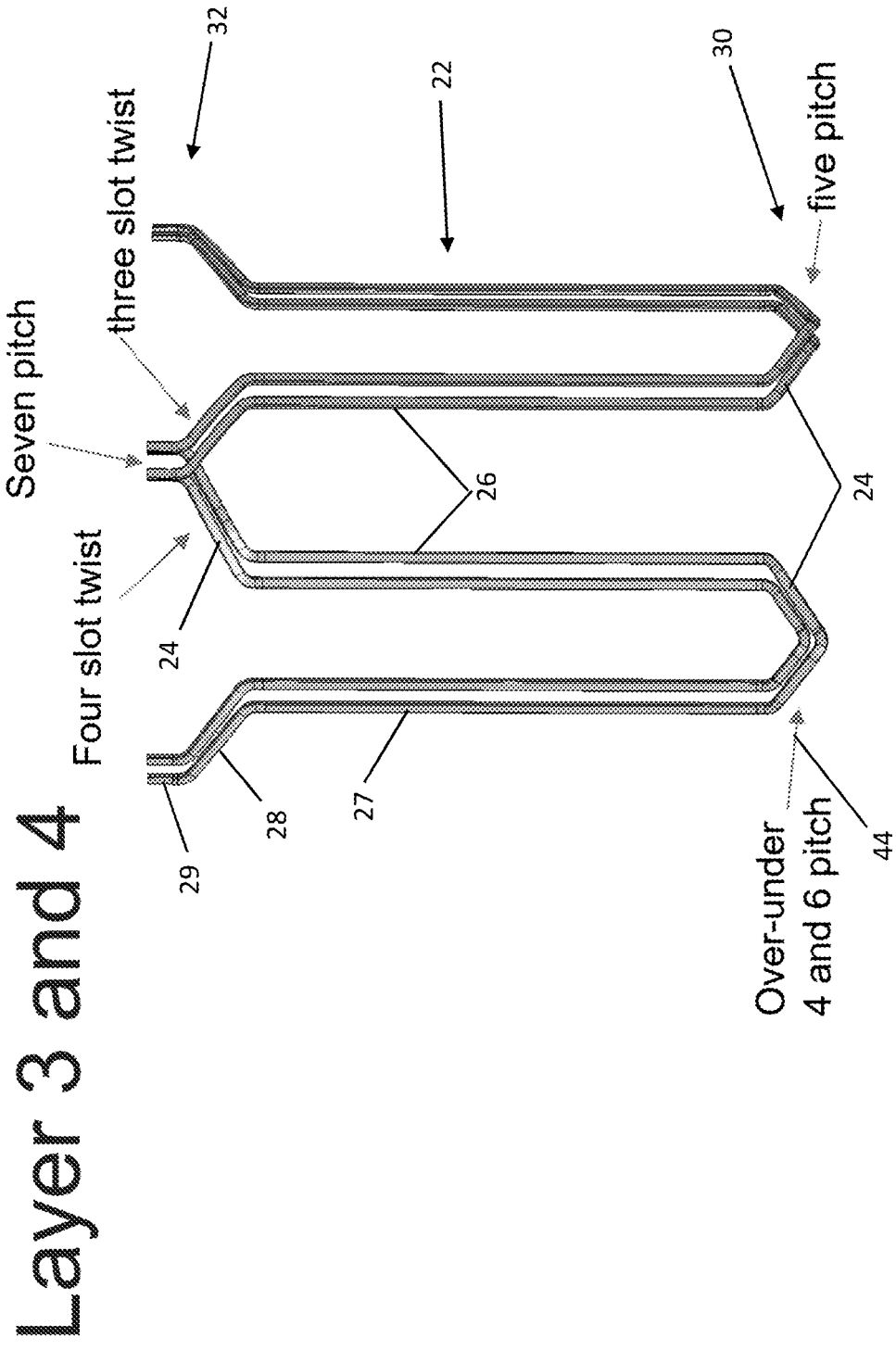
FIG. 5B is a perspective view of segmented conductors used in third and fourth slot layers of the winding arrangement of FIG. 4.

With reference now to FIG. 5B, exemplary U-shaped conductors used to form two of the conductor paths (e.g., path A and path B) of layers 3 and 4 of the winding arrangement of FIG. 4 are shown, and particularly the conductor paths extending from poles five through eight. As shown in FIG. 5B, the two end loops 24 on the crown end 30 extend between the slot sets of poles five and six and form over-under end turns having pitches of four and six, respectively. The remainder of the end loops on the crown end 30 for layers 3 and 4 are five pitch end loops, including the two end loops extending between the slot sets of poles seven and eight, as shown in FIG. 5B. On the opposite end of the core, i.e., on the connection end 32, the leg ends are twisted to provide adjacent terminal ends that are then welded together to form the end loops. As noted previously, all of the end loops 24 on the connection end 32 for layers 3 and 4 are seven pitch end loops. In order to form these end loops, the leg ends of layer 3 are twisted three slots, and the leg ends of layer 4 are twisted four slots. The terminal ends of these leg ends are then connected together to form seven pitch end turns between layers 3 and 4 on the connection end 32 of the core.

Figure 5C:
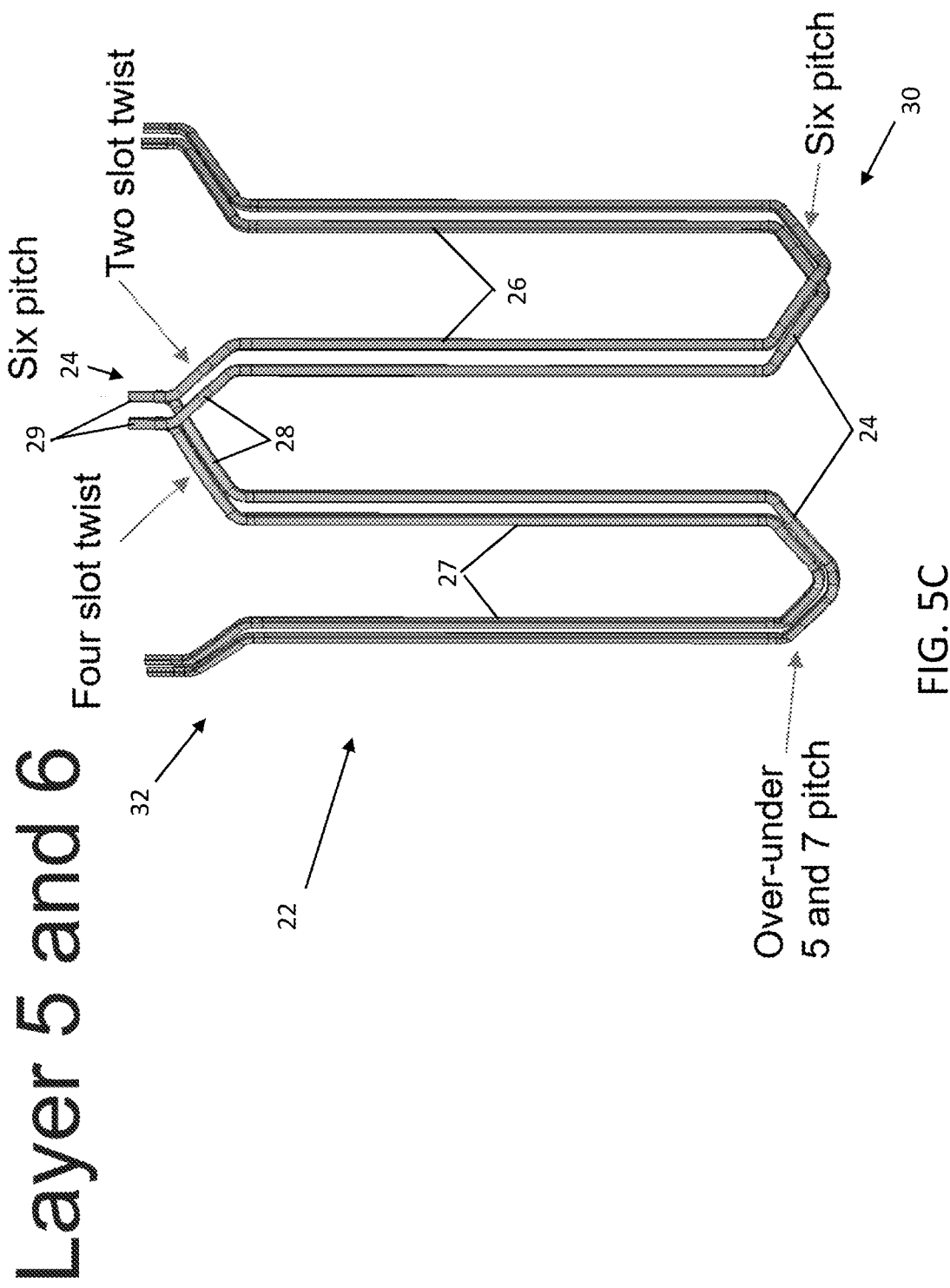
FIG. 5C is a perspective view of segmented conductors used in fifth and sixth slot layers of the winding arrangement of FIG. 4.

With reference now to FIG. 5C, exemplary U-shaped conductors used to form two of the conductor paths (e.g., path A and path B) of layers 5 and 6 of the winding arrangement of FIG. 4 are shown, and particularly the conductor paths extending from poles five through eight. As shown in FIG. 5C, the two end loops 24 on the crown end 30 extend between the slot sets of poles five and six and form over-under end turns having pitches of five and seven, respectively. The remainder of the end loops on the crown end 30 for layers 3 and 4 are six pitch end loops, including the two end loops extending between the slot sets of poles seven and eight, as shown in FIG. 5C. On the opposite end of the core, i.e., on the connection end 32, the leg ends are twisted to provide adjacent terminal ends that are then welded together to form the end loops. As noted previously, all of the end loops 24 on the connection end 32 for layers 5 and 6 are six pitch end loops. In order to form these end loops, the leg ends of layer 5 are twisted two slots, and the leg ends of layer 6 are twisted four slots. The terminal ends of these leg ends are then connected together to form six pitch end turns between layers 5 and 6 on the connection end 32 of the core.

In view of the above-described twists as illustrated in FIGS. 4-5C, it will be recognized that crossover end loops between layers 2 and 3 and between layers 4 and 5 are easily formed on the connection end 32 of the stator core. The common twist for each of layers 1-3 is three slots, so a six pitch crossover end loop is easily formed between layers 2 and 3 via the adjacent leg ends positioned between poles two and three. Similarly, because the common twist for layer 4 is four and the common twist for layer five is two, a six-pitch crossover end loop is also easily formed between layers 4 and 5 via the adjacent leg ends positioned between poles two and three.

Figure 6:
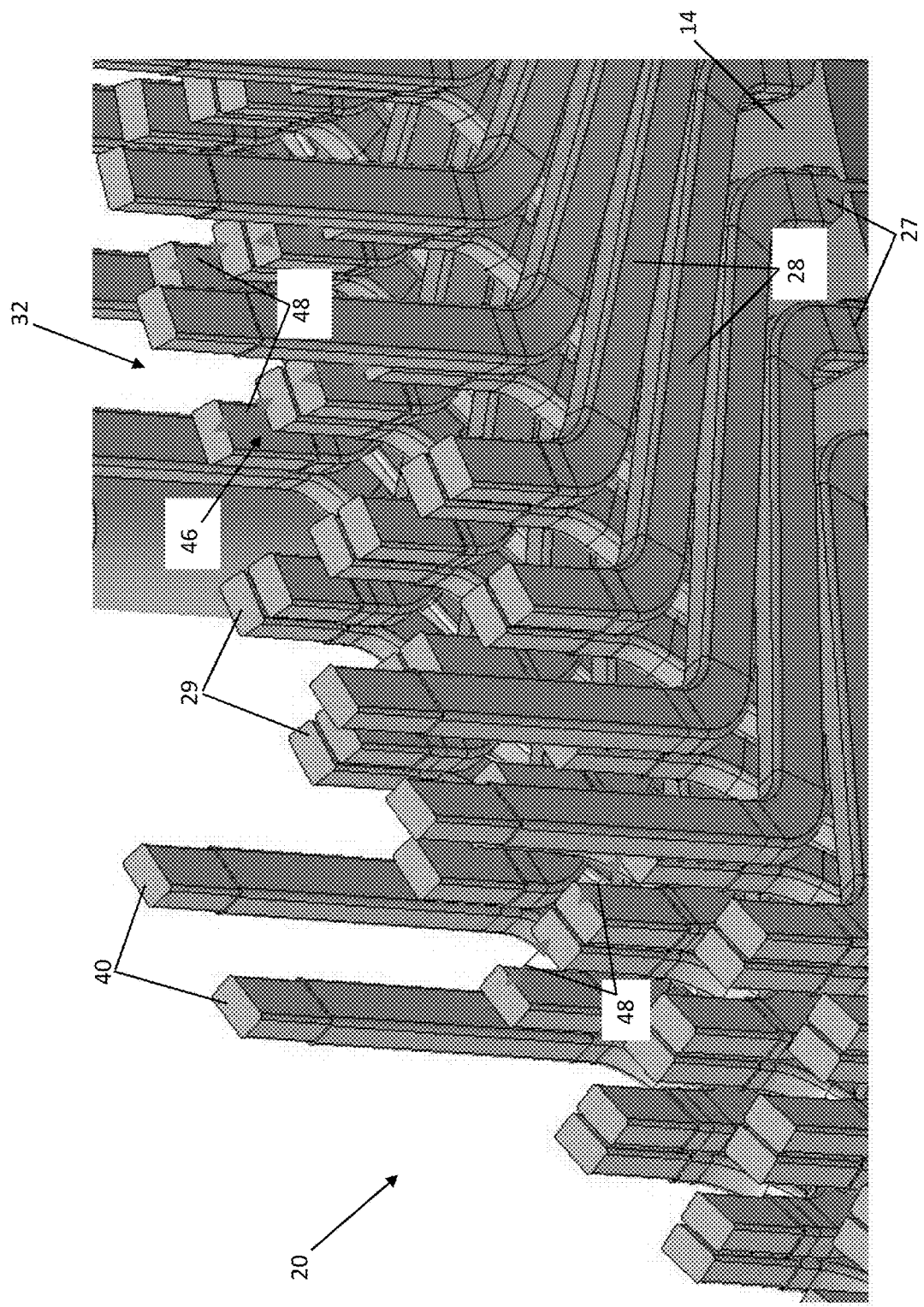
FIG. 6 is a perspective view of conductors at the weld end of the winding arrangement of FIG. 4.

Advantageously, the winding arrangement of FIG. 4 provides a winding wherein all adjacent terminal portions 29 of the twisted leg ends, including the terminal portions associated with the crossover end loops between layer pairs, are aligned in radial rows on the connection end of the stator core, the number of radial rows being equal to the number of slots of the core. FIG. 6 shows a perspective view of the connection end of the winding arrangement of FIG. 4, including a plurality of terminal portions 29 of leg ends that form end loops 24. As shown in the figure, the terminal portions 29 of the twisted leg ends from adjacent layers are all radially aligned, including the terminal portions 29a that form regular end loops within a layer pair, and the terminal portions 29b that form crossover end loops 46 between layer pairs. As shown in FIG. 6, three pairs of adjacent terminal portions 29 are included in each radial row, and the terminal portions 29 are all aligned in radial rows. Adjacent terminal portions are connected to form the end loops. Arrows 48 illustrate the connections between adjacent terminal portions 29 that result in crossover end loops 46 that connect two different layer pairs (e.g., a crossover end loop that connects the first layer pair provided in layers 1 and 2 to the second layer pair provided in layers 3 and 4). It will be noted that the adjacent terminal portions associated with the crossover end loops 46 are located in the same rows as the leads 40. Thus, only two pairs of adjacent terminal portions 29 are provided in these rows, and particularly the adjacent terminal portions that are connected between rows 2 and 3 and between rows 4 and 5. In all other rows that do not include leads 40 and crossover end turns 46, each connected terminal portions is associated with one layer pair, i.e., terminal portion connections between layers 1 and 2, between layers 3 and 4, and between layers 5 and 6. Because the adjacent terminal portions 29 are all aligned in radial rows, including those associated with crossover end turns 46, forming connections between the adjacent terminal portions is completed by welding pairs of adjacent leg ends together in each radial row.

In view of the foregoing, it will be recognized that the winding arrangement in the embodiment discussed in association with FIGS. 4-6 is comprised of numerous conductor legs arranged in layers (L) of a plurality of slots, wherein L is equal to six. The layers include a first half of consecutive layers and a second half of consecutive layers, wherein each leg end extending from each of the layers has a common twist associated with the layer from which said leg extends. The common twist associated with each layer of the first half of consecutive layers (i.e., layers 1-3) is a first common twist ($CT_1$, wherein $CT_1=3$). The common twist associated with each layer of the second half of consecutive layers (i.e., layers 4-6) alternates between a second common twist ($CT_2$) and a third common twist ($CT_3$), wherein $CT_2 \geq CT_1+1$ (i.e., $CT_2 \geq 4$), and wherein $CT_3 \leq CT_1-1$ (i.e., $CT_3 \leq 2$).

Additionally, the winding arrangement of FIGS. 4-6 may be recognized as a winding wherein each of the end turns on the connection end of the core connects straight portions of conductors arranged in two consecutive layers of different slots, wherein each of said end turns includes a first common twist associated with one of the two consecutive layers and a second common twist associated with another of the two consecutive layers. In such embodiment, the first common twist and the second common twist are identical for the end turns in the first half of consecutive layers (e.g., in layers 1-3, the common twist is three), but the first common twist and the second common twist alternate between different pitches for the end turns in the second half of consecutive layers (e.g., the common twist is four in layers 4 and 6, and the common twist is two in layer 5).

Furthermore, the winding arrangement of FIGS. 4-6 may be recognized as a winding wherein the straight portions are arranged in layers in the slots, wherein the layers include a total number of layers, the layers including at least two inner layers, at least two outer layers, and two middle layers positioned between the inner layers and the outer layers. In such an embodiment, most of the first end turns and most of the second end turns have a common pitch (CP), most of the first end turns connecting the straight portions of the two middle layers have a pitch of CP+1, and most of the second end turns connecting the straight portions of the two middle layers have a pitch of CP−1.

Figure 7A:
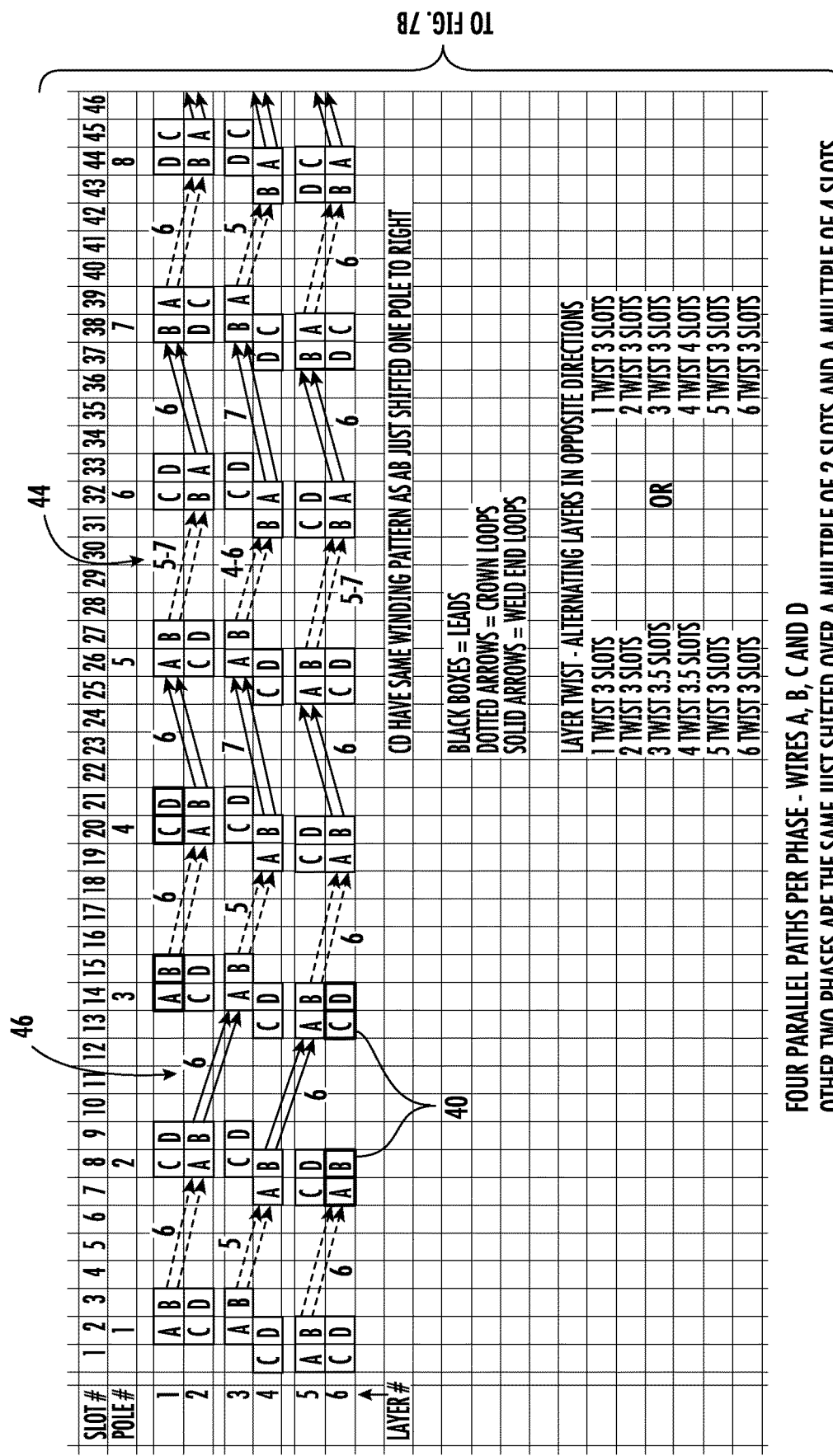

Winding Arrangement with Odd Number of Layer Pairs and Misaligned Crossover Leg Ends With reference now to FIGS. 7A and 7B, a tabular view of an alternative embodiment of the winding arrangement of FIG. 4 is shown. It will be noted that FIGS. 7A and 7B are shown in different figures, but are combined to provide a complete tabular schematic of the winding arrangement wherein FIG. 7A is the left side of the schematic and FIG. 7B is the right side of the schematic. Accordingly, the term "FIG. 7" as used herein refers to the complete schematic of the winding wherein FIGS. 7A and 7B are combined. The winding arrangement of FIG. 7 is similar to FIG. 4, and is a three phase winding 20 with four parallel paths per phase (i.e., paths A-D). Like FIG. 4, the conductors in the winding of FIG. 7 are arranged in a number of layers (L) in each slot such that L/2 is an odd number, and specifically with six layers of conductors in each slot such that L/2=3. Only the end turns between path A and path B are shown in FIG. 7, for the sake of brevity. The end turns 24 on the crown end 30 are shown as dotted line arrows, and the end turns on the connection end are shown as solid line arrows in FIG. 4. It will be recognized that the end turns between path C and path D (not shown) are similar to those shown for path A and path B, but the end turns are on the opposite side of the core.

A comparison of FIG. 7 to that of FIG. 4 shows that the conductor arrangement within the slots and the end turn pitches are identical for each winding arrangement. However, the twists used to form the end loops on the connection end 32 in the winding arrangement of FIG. 7 are slightly different from the twists of the winding arrangement of FIG. 4. Specifically, in the embodiment of FIG. 7, the twists at the connection end are as follows:

Layer 1 and 2: twist all leg ends 3 slots, but in opposite directions in layer 1 as compared to layer 2;

Layer 3 and 4: twist all leg ends 3.5 slots, but in opposite directions in layer 3 as compared to layer 4; and Layer 5 and 6: twist all leg ends 3 slots, but in opposite directions in layer 5 as compared to layer 6.

The foregoing illustrates one possible twist arrangement for the leg ends of the winding of FIG. 7. In at one alternative embodiment also noted in FIG. 7, the twists are as follows:

Layer 1 and 2: twist all leg ends 3 slots, but in opposite directions in layer 1 as compared to layer 2;
Layer 3: twist all leg ends 3 slots in the opposite direction from layer 2;
Layer 4: twist all leg ends 4 slots in the opposite direction from layer 3; and
Layer 5 and 6: twist all leg ends 3 slots, but in opposite directions in layer 5 as compared to layer 6.

Figure 8:
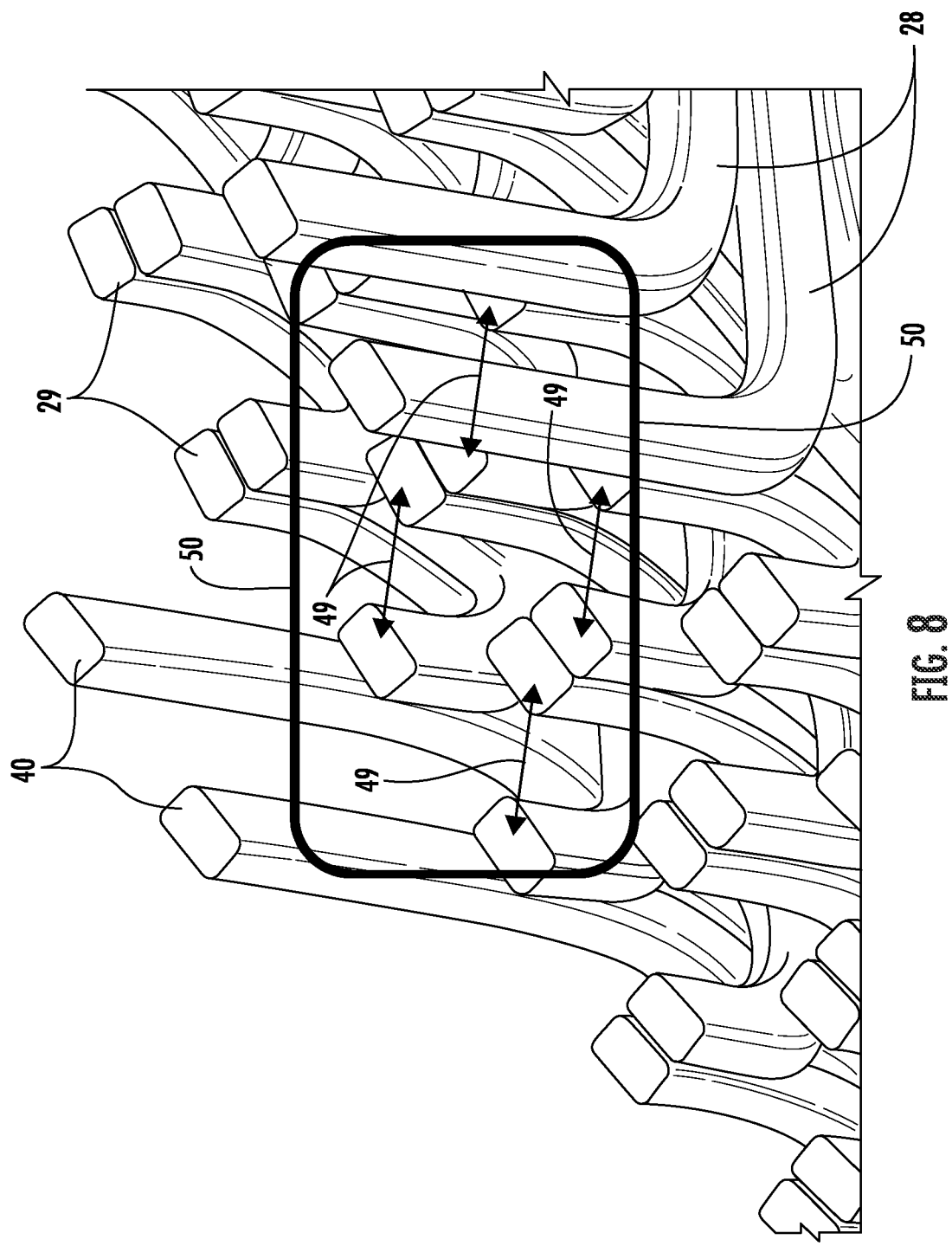
FIG. 8 is a perspective view of conductors at the weld end of the winding arrangement of FIG. 7.

The twists in the winding arrangement of FIG. 7 result end loops having the shortest triangle shape and therefore a preferred shorter path and resistance levels than the winding arrangement of FIG. 4. However, as a result of the twisting in the winding arrangement of FIG. 7, the terminal ends associated with the crossover end loops 46 are neither adjacent nor aligned in radial rows. This is illustrated in FIG. 8 wherein the arrows 49 show that the terminal portions 29 of the crossover end loops 46 are not aligned in the radial direction. In particular, as shown within the box 50 of FIG. 8, the desired connections between terminal portions associated with the crossover end turns 46 are shown by arrows 49, and the arrows are circumferentially offset from one another and not radially aligned.

Even though the terminal portions associated with the crossover end turns are not radially aligned, relatively simple options are available for making connections between the terminal portions and completing the crossover end loops. For example, one option is to make the leg ends associated with the crossover end turns longer than those of the other segmented conductors, and weld the terminal portions of the leg ends associated with the crossover end turns above the other hairpin welds. Another option is to connect the terminal portions crossover end turns with a separate copper track/jumper. Yet another option is to twist the terminal portions of the crossover end turns differently than the other twists in their layers, resulting in the terminal portions being aligned. This option may require insulation material to be placed in between them and the other weld joints as they will be crowded together.

In view of the foregoing, it will be recognized that the winding arrangement of FIG. 7 has many of the features as that of FIG. 4. For example, the winding arrangement of FIG. 7 may be recognized as a winding wherein the straight portions are arranged in layers in the slots, wherein the layers include a total number of layers, the layers including at least two inner layers, at least two outer layers, and two middle layers positioned between the inner layers and the outer layers. In such an embodiment, most of the first end turns and most of the second end turns have a common pitch (CP), most of the first end turns connecting the straight portions of the two middle layers have a pitch of CP+1, and most of the second end turns connecting the straight portions of the two middle layers have a pitch of CP−1. However, unlike the arrangement of FIG. 4, the connections between the terminal portions associated with crossover end turns are not radially aligned in the winding arrangement of FIG. 7.

ALTERNATIVE EMBODIMENTS

While embodiments of the winding arrangement are disclosed herein, it will be recognized that other embodiments are also possible. For example, while the winding arrangements disclosed herein have been described in association with segmented conductors with welded end loops at the connection end, in at least some embodiments, the winding arrangements may be formed with continuous wire segments (e.g., the entire path A for a given phase may be formed with one continuous wire). In this case the different twists may be formed in the end loops by an end loop forming machine. The non-symmetrical twist end loops would be non-symmetrical end loops without the weld in the middle.

As another example, in at least one embodiment the winding is configured with the CP+1 end loops and the CP−1 end loops are not associated with the two middle adjacent layers, but are instead associated with the two inner adjacent layers or the two outer adjacent layers.

As yet another example of an alternative embodiment, the winding arrangement could be provided with a different number of slots-per-pole-per-phase or a different number of conductor layers than those disclosed herein. For example, with respect to the number of slots-per-pole-per-phase, it is possible to have three (3) slots per pole per phase. In this case, the common pitch (CP) for most layers would be nine (9) and the other two common pitches (CP+1 and CP−1) would be ten (10) and eleven (11). As another example, it is possible to have four (4) slots per pole per phase and the common pitch for most layers would be twelve (12) and the other two common pitches would be eleven (11) and thirteen (13). Similarly, it is possible to have five (5) or six (6) slots per pole per phase. With respect to the number of conductor layers, it is possible to have ten (10) conductors per slots or fourteen (14) conductors per slot, or any other number of layers (L), where L/2=an odd number.

Various insulation arrangements are also possible for the windings disclosed herein. For the half-full-half phase belt, every other slot houses half the wires from one phase and half the conductors from another phase (and the slots in-between only house conductors for one phase). The design with the middle layers having end loops with CP+1 and CP−1 pitches is particularly advantageous as this ends up with a design having every other slot housing the outer half layers of one phase and the inner half wires of another phase. Therefore the two phases only contact each other in one position, i.e., between the inner half and the outer half. It may be desirable to have extra insulation (e.g., nomex paper) between the phases and this design would therefore only have one area to place insulation. The insulation could be two tubes or a slot liner having the shape of B wherein the upper part of the B surrounds half of the wires in the slot and the lower half of the B surrounds the inner wires of the slot In at least one embodiment, for the layers with the most common pitch ($CP_1$, some of (or all) the end loops could be over-under end loops where at least one end loop goes over at least one end loop. In this case the average pitch of the end loops is equal to the common pitch. For example, a two (2) slots per pole per phase machine may have an end loop of seven (7) pitch go over and end loop of five (5) pitch. In this case the average pitch is six (6), which is the common pitch ($CP_1$). This embodiment also applies to the special two layers. For example middle layers 3 and 4 have a common pitch equal to five on the crown end. However, this layer may have over-under end loops where the over pitch is six (6) and the under pitch is four (4).

Although the various embodiments have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine comprising:
    a stator core including a plurality of teeth defining a plurality of slots; and
    a winding positioned on the stator core, the winding comprising a plurality of segmented conductors connected together to provide a plurality of parallel paths per phase for the winding, each conductor comprising (i) an end loop provided on a crown end of the stator core, (ii) two legs extending through the slots, and (iii) two leg ends extending out of the slots on a connection end of the stator core, each leg end having a twist portion;
    wherein the legs are arranged in layers in the slots, wherein the layers include a total number of layers (L), wherein L is greater than five, and wherein the layers include a first half of consecutive layers and a second half of consecutive layers;
    wherein each leg end extending from each of the layers has a common twist associated with the layer from which said leg end extends;
    wherein the common twist associated with at least one layer of the first half of consecutive layers is a first common twist ($CT_1$);
    wherein the common twist associated with at least one layer of the second half of consecutive layers is a second common twist ($CT_2$);
    wherein the common twist associated with at least one additional layer of the second half of consecutive layers is a third common twist ($CT_3$); and
    wherein $CT_2 > CT_1$, and wherein $CT_3 < CT_1$.

2. The stator of claim 1 wherein the common twist associated with each layer of the second half of consecutive layers alternates between $CT_2$ and $CT_3$.

3. The stator of claim 1 wherein the common twist associated with each layer of the first half of consecutive layers is $CT_1$.

4. The stator of claim 2 wherein $L=8$, $CT_1=3$, $CT_2=4$ and $CT_3=2$.

5. The stator of claim 1 wherein the winding further includes connections between leg ends extending from adjacent layers of the winding on the connection end of the stator core, wherein crossover end turns are formed by connections between leg ends in two middle layers.

6. The stator of claim 5 wherein said crossover end turns are either five pitch or seven pitch end turns.

7. The stator of claim 1, wherein the winding defines a plurality of poles, each pole associated with a slot set, wherein the segmented conductors in the first half of consecutive layers of each slot set are shifted one slot to the left of the conductors in the second half of consecutive layers.

8. The stator of claim 7 wherein $L=6$, $CT_1=3$, $CT_2=4$ and $CT_3=2$.

9. The stator of claim 7 wherein the winding further includes connections between leg ends extending from adjacent layers of the winding on the connection end of the stator core, wherein all of said connections form six pitch end turns with the exception of middle end turns formed by connections between leg ends in layer three and leg ends in layer four.

10. The stator of claim 9 wherein said middle end turns are either five pitch or seven pitch end turns.

11. The stator of claim 1 wherein $CT_2 \geq CT_1+1$, and wherein $CT_3 \leq CT_1-1$.

12. The stator of claim 1 wherein the winding is a two slots per pole per phase winding.

13. The stator of claim 1 wherein each leg end further includes a terminal portion, wherein the winding further includes connections between pairs terminal portions of leg ends extending from adjacent layers of the slots, wherein all of said pairs of terminal portions are radially aligned.

14. The stator of claim 1 wherein $L>8$.

15. The stator of claim 1 wherein the winding is defined by a half-full-half phase bell in the slots.

16. A stator for an electric machine comprising:
    a stator core including a plurality of teeth defining a plurality of slots; and
    a winding positioned on the stator core, the winding comprising a plurality of conductors connected together to provide a plurality of parallel paths per phase, each phase having a half-full-half phase belt, the winding further comprising (i) a plurality of first end turns provided on a first end of the stator core, (ii) straight portions extending through the slots, and (iii) a plurality of second end turns provided on a second end of the stator core;
    wherein the straight portions are arranged in layers in the slots, wherein the layers include a total number of layers (L), the layers including a first half of consecutive layers and a second half of consecutive layers;
    wherein each of the second end turns connects straight portions in two consecutive layers of two slots, each of said second end turns including a first common twist associated with one of the two consecutive layers and a second common twist associated with another of the two consecutive layers, wherein the first common twist and the second common twist are identical for the second end turns in the first half of consecutive layers, wherein the first common twist and the second common twist are different for the second end turns in the second half of consecutive layers.

17. The stator of claim 16 wherein the common twist associated with each layer in the first half of consecutive layers is three and wherein the common twist associated with each layer in the second half of the consecutive layers is either two or four.

18. The stator of claim 16 wherein the first half of consecutive layers are outer layers on the stator core and the second half of consecutive layers are inner layers on the stator core.

19. The stator of claim 16 wherein the conductors are a plurality of segmented conductors, each segmented conductor comprising (i) an end loop provided on a crown end of the stator core, (ii) two legs extending through the slots, and (iii) two leg ends extending out of the slots on a connection end of the stator core, each leg end having a twist portion and a terminal portion, wherein the winding further includes connections between pairs of terminal portions of leg ends extending from adjacent layers of the slots, and wherein all of said pairs of terminal portions are radially aligned.

20. A stator for an electric machine comprising:
    a stator core including a plurality of teeth defining a plurality of slots; and
    a winding positioned on the stator core, the winding comprising a plurality of segmented conductors connected together to provide a plurality of parallel paths per phase for the winding, each conductor comprising (i) an end loop provided on a crown end of the stator core, (ii) two legs extending through the slots, and (iii) two leg ends extending out of the slots on a connection end of the stator core, each leg end having a twist portion and a terminal portion, wherein the terminal portions of the leg ends are connected together to form end loops on the connection end of the stator core;

wherein the legs are arranged in layers in the slots, the layers including at least two inner layers, at least two outer layers, and two middle layers positioned between the at least two inner layers and the at least two outer layers;

wherein each of the plurality of the end loops on the connection end of the stator extends between a first leg in one layer and a second leg in another layer such that each of the plurality of end loops on the connection end is associated with two layers;

wherein most of the end loops on the connection end that are associated with the at least two inner layers and the at least two outer layers have a common pitch (CP), wherein most of the end loops associated with the two middle layers have a pitch of one of CP+1 or CP−1.

* * * * *